United States Patent [19]
Workman et al.

[11] Patent Number: 5,394,757
[45] Date of Patent: Mar. 7, 1995

[54] MULTIPLE STYLUS PROBE ATTACHMENT AND METHODS

[75] Inventors: Myron L. Workman; James D. Burton, both of Brigham City; Bret L. Pearson, Woods Cross; Randy Jensen, Brigham City; Bret Pond, Honeyville; K. Bert Rose, Tremonton, all of Utah

[73] Assignee: Thiokol Corporation, Ogden, Utah

[21] Appl. No.: 904,209

[22] Filed: Jun. 25, 1992

[51] Int. Cl.$^6$ ............................................. G01B 5/00
[52] U.S. Cl. ................................. 73/866.5; 33/559; 33/560
[58] Field of Search ............... 73/866.5, 104, 105; 33/559, 560, 561

[56] References Cited
U.S. PATENT DOCUMENTS

| 1,879,398 | 9/1932 | Mirfield . | |
|---|---|---|---|
| 2,448,106 | 8/1948 | Mannerbrink et al. | 33/199 |
| 2,630,633 | 3/1953 | Webb | 33/180 |
| 2,880,518 | 4/1959 | Settele | 33/199 |
| 3,840,994 | 10/1974 | Izumi et al. | 33/174 |
| 3,869,799 | 3/1975 | Neuer et al. | 33/560 |
| 4,118,871 | 10/1978 | Kirkham | 33/174 |
| 4,153,998 | 5/1979 | McMurtry | 33/174 |
| 4,384,332 | 5/1983 | McMurtry | 364/474 |
| 4,451,892 | 5/1984 | McMurtry | 364/474 |
| 4,524,523 | 6/1985 | Golinelli et al. | 33/560 |
| 4,562,392 | 12/1985 | Davis et al. | 318/572 |
| 4,578,873 | 4/1986 | Klingler et al. | 33/559 |
| 4,580,348 | 4/1986 | De Boynton et al. | 33/199 |
| 4,583,159 | 4/1986 | Kanemoto et al. | 364/170 |
| 4,608,747 | 9/1986 | Link et al. | 29/568 |
| 4,660,296 | 4/1987 | Klingler et al. | 33/559 |
| 4,761,891 | 8/1988 | Sugimura | 33/503 |
| 4,901,256 | 2/1990 | McMurtry et al. | 364/560 |
| 4,908,951 | 3/1990 | Gurny | 33/503 |
| 4,938,083 | 7/1990 | Gurny et al. | 73/866.5 |
| 4,941,266 | 7/1990 | Bissegger et al. | 33/559 |
| 4,987,303 | 1/1991 | Takase et al. | 73/105 |
| 4,997,287 | 3/1991 | Tittl | 33/560 |
| 5,029,398 | 7/1991 | Ertl | 33/559 |
| 5,103,572 | 4/1992 | Ricklefs | 33/559 |
| 5,121,551 | 6/1992 | Linder et al. | 33/559 |

OTHER PUBLICATIONS

Renishaw Electrical Limited 3 Dimensional Probes for In-Cycle Gauging Applications on Machining Centres and Lathes catalog (date unknown).
Probes, Styli & Accessories, IAD Worldwide, Inc., Catalog #3 (date unknown).

Primary Examiner—Tom Noland
Assistant Examiner—George M. Dombroske
Attorney, Agent, or Firm—Ronald L. Lyons

[57] ABSTRACT

The apparatus of the present invention includes a multiple stylus probe attachment capable of attachment to a probing mechanism mounted to a turret tool station of a numerically controlled lathe for use in probing various surfaces of a workpiece. The probe attachment includes a base configured for attachment to the probing mechanism along a longitudinal axis of the probing mechanism. The probe attachment further includes a first stylus attached to the base with the distal end of the first stylus extending in a direction generally parallel to the longitudinal axis of the probing mechanism. A second stylus is attached to the base with its distal end extending in a direction generally perpendicular to the longitudinal axis of the probing mechanism. After the probe attachment is secured to the probing mechanism, the probe is calibrated by calibrating both styli. The probe may then be utilized to measure various surfaces of a workpiece while positioned in the workpiece holder of the lathe.

18 Claims, 2 Drawing Sheets

MULTIPLE STYLUS PROBE ATTACHMENT AND METHODS

BACKGROUND

1. The Field of the Invention

The present invention is related to apparatus and methods for measuring a workpiece in a workpiece holder of a numerically controlled lathe. More particularly, the present invention is related to a multiple stylus probe attachment for attachment to a probing mechanism mounted in a turret tool station of a numerically controlled lathe and used for probing various surfaces of a workpiece.

2. Technical Background

The incorporation of electronic inspection probes in numerically controlled lathes permits the rapid, precise inspection of the workpiece, while reducing to a minimum the possibility for operator error. Through the use of such probes, scrap levels are reduced and efficiency is greatly enhanced.

A typical inspection probe utilized in a numerically controlled lathe includes a probing mechanism which is mounted in one of the turret tool stations of the lathe. Attached to and extending outwardly from the probing mechanism is a stylus having a sensing tip such as a ruby ball. Within the probing mechanism is an electronic switch which is actuated when the sensing tip of the stylus comes into contact with the part being measured.

Once the probe has been calibrated, the probe may be used in a variety of ways to expedite the machining of workpieces and to increase the efficiency and accuracy of the machining process. For example, the probe may be used to calibrate tools and to monitor tool wear. Additionally, the probe may be used to check workpieces prior to their removal from the lathe to ensure that they have been machined within permitted tolerances.

Because workpieces may be required to be machined into a variety of configurations, it may be necessary to utilize different configurations of styli in order to permit the probe to reach the various surfaces. For example, on the workpiece 10 of FIG. 1, the stylus 12 is configured such that it may be used to probe a front face 14, a back face 16 and an outside diameter 18 of the workpiece 10. Because of the shape of the stylus 12, it cannot be used to probe the inside diameter 20.

To permit the probe to measure the inside diameter 20 of the workpiece, a different shaped stylus must be used. Thus, in conventional practice, the stylus 12 is removed from the probing mechanism and a different shaped stylus 22, such as that illustrated in FIG. 2, is attached. With the stylus 22 mounted on the probing mechanism, the outside diameter 18, the inside diameter 20 and the front face 14 of the workpiece 10 may be probed.

A principal disadvantage to replacing the stylus is the time required to recalibrate the probe for the new stylus. Calibration of the probe generally involves initially setting or "timing" the probe off a point having a known coordinate, such as a point on the chuck or fixture for which a Z coordinate (axially of the workpiece) is known. This coordinate value is entered into the computer which controls the lathe and this coordinate value serves as a starting point for calibration. The probe must also be timed to a point having a known X coordinate (radially of the workpiece).

Each of the tools on the lathe must then be timed to the points on the fixture to which the probe was timed. Depending on the lathe being used, there may be over a dozen tools which must be timed in this fashion. Timing the tools to the same known coordinates as the probe ensures that the tools are synchronized to the probe. Thus, as further adjustments are made to calibrate the probe, these adjustments will automatically be translated to the tools.

A test cut or check point is then cut into the workpiece with each tool. The check point is probed with the probe and the coordinate recorded. A micrometer may be used to manually measure the workpiece at the checkpoint. (The micrometer should first be checked against a standard to ensure that it is calibrated.) The result of the manual measurement with the micrometer is then compared with the measurement taken by the probe. The probe is then offset to compensate for any difference between the two measurements.

The machining program is then run and the workpiece is machined by the tools of the lathe according to the specifications programmed into the lathe. When the first workpiece is completed, a "first article inspection" is conducted by placing the completed workpiece on a coordinate measuring machine or other standardized measuring tool and measuring it to verify whether the manual measurement taken by the micrometer was accurate. If a discrepancy is found, the probe may be further offset, thereby completing the calibration process.

After the probe has been calibrated, numerous workpieces may be accurately machined by the lathe without having to further adjust the probe. Each workpiece may be probed, thereby monitoring tool wear and enabling the lathe operator to know when tools should be replaced. However, if a probe having a different shape of stylus is required to complete the machining of a workpiece or to machine a different part, the probe must be recalibrated with the new stylus by following the same procedure outlined above.

In many instances, the time-consuming procedure of switching probes and recalibrating, as described above, is the accepted procedure when machining workpieces requiring two configurations of probes for inspection. Calibrating a probe according to the procedure described above can result in a set-up time of greater than 45 minutes. Thus, each time a different stylus is mounted on the probe, substantial time must be invested in recalibrating the probe.

Thus, it would be an advancement in the art to provide probing apparatus and methods which would permit the measurement of various surfaces of a workpiece, thereby avoiding the need to repeatedly change the stylus and recalibrate the probe.

Indeed, it would be a further advancement in the art to provide apparatus and methods for probing a workpiece in a lathe, whereby different shaped styli could be employed in connection with a single probe, while avoiding having to repeatedly recalibrate the probe each time a different stylus is necessitated.

Such apparatus and methods are disclosed and claimed herein.

BRIEF SUMMARY AND OBJECTS OF THE INVENTION

The present invention is directed to a novel device for attachment to a probing mechanism mounted to a turret tool station of a numerically controlled lathe for use in probing various surfaces of a workpiece. The device is a dual stylus probe attachment which includes a base configured for attachment to the probing mechanism in substantially the same manner as a conventional probe would attach to the probing mechanism. Thus, the base is integrally attached to a sensing device in the probing mechanism such that slight movement of the base triggers the electronic switch located within the probing mechanism.

The dual stylus probe attachment further includes a first stylus attached to the base such that it extends outwardly from the base in a direction generally parallel to the longitudinal axis of the probing mechanism. As used herein, the "longitudinal axis of the probing mechanism" refers to the axis extending longitudinally through the probing mechanism and through the sensing device to which the base is mounted.

The probe attachment also includes a second stylus attached to the base and extending outwardly from the base. The second stylus is preferably disposed in a direction generally perpendicular to the longitudinal axis of the probing mechanism and to the first stylus.

In a preferred embodiment, the first stylus extends outwardly from the face of the base and is offset from the longitudinal axis of the probing mechanism. The second stylus extends outwardly from the side of the base and is positioned along a line which intersects the longitudinal axis of the probing mechanism and a line along the length of the first stylus.

Like the styli utilized in conventional single probe apparatus, the styli utilized according to the teachings of the present invention have a sensing tip such as a ruby ball. The styli are also preferably configured to break upon the application of a predetermined force to the styli. Thus, a force which could damage the probing mechanism will not be transferred to the probing mechanism through either of the styli.

According to the method of the present invention, the dual stylus probe attachment is attached to the probing mechanism which is mounted in the turret tool station of a numerically controlled lathe. The probe is then calibrated by calibrating both styli according to known calibration methods, such as those described above. At a minimum, calibration entails timing the probe and all of the tools off a known coordinate point, running a check cut of the tools on the workpiece, manually measuring the check cut and comparing the manual measurement with the measurement obtained from the probe, adjusting the probe, conducting a first-article inspection and again adjusting the probe.

Once the probe with the dual stylus probe attachment connected to it has been calibrated, the probe may be utilized in measuring various surfaces on a workpiece. Importantly, the probe may be utilized in measuring a front and back face and a inside and outside diameter of a workpiece without having to change styli, and without having to perform any recalibration. Importantly, the set-up time for new workpieces may be reduced to under five minutes because the probe does not have to be recalibrated. This represents a significant time savings when compared to the approximate 45 minutes required for set up when the probe must be recalibrated because a stylus having a different shape is required.

The substantial time savings results in lower labor cost which ultimately translates into a less expensive product. Additionally, scrap levels are reduced because the potential for human error during recalibration is eliminated. Decreased scrap levels also lowers production cost.

Thus, it is an object of the present invention to provide probing apparatus and methods which permit the measurement of various surfaces of a workpiece, thereby avoiding the need to repeatedly change the stylus and recalibrate the probe.

It is a further object of the present invention to provide such apparatus and methods for probing a workpiece whereby different shaped styli are employed in connection with a single probe, thereby avoiding having to repeatedly recalibrate the probe each time a different stylus is necessitated.

These and other objects and advantages of the present invention will become more fully apparent by examination of the following description of the preferred embodiments and the accompanying drawings.

DETAILED DESCRIPTION OF THE PREFERRED EMBODIMENTS

Figure 3:
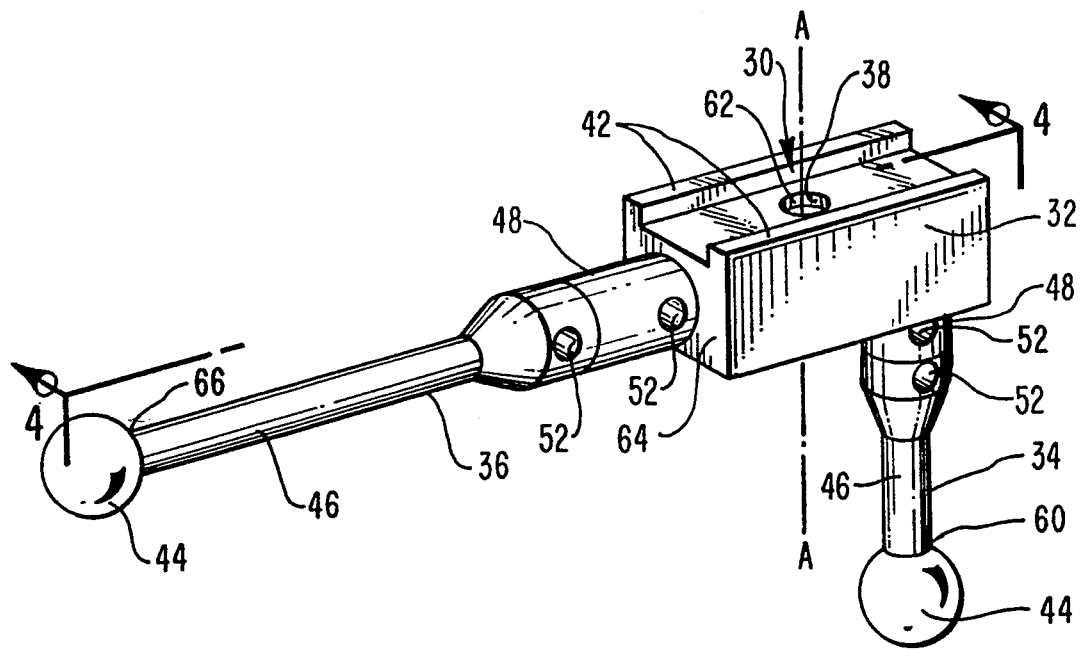
FIG. 3 is a perspective view of one embodiment of the dual stylus probe attachment according to the teachings of the present invention.
Figure 4:
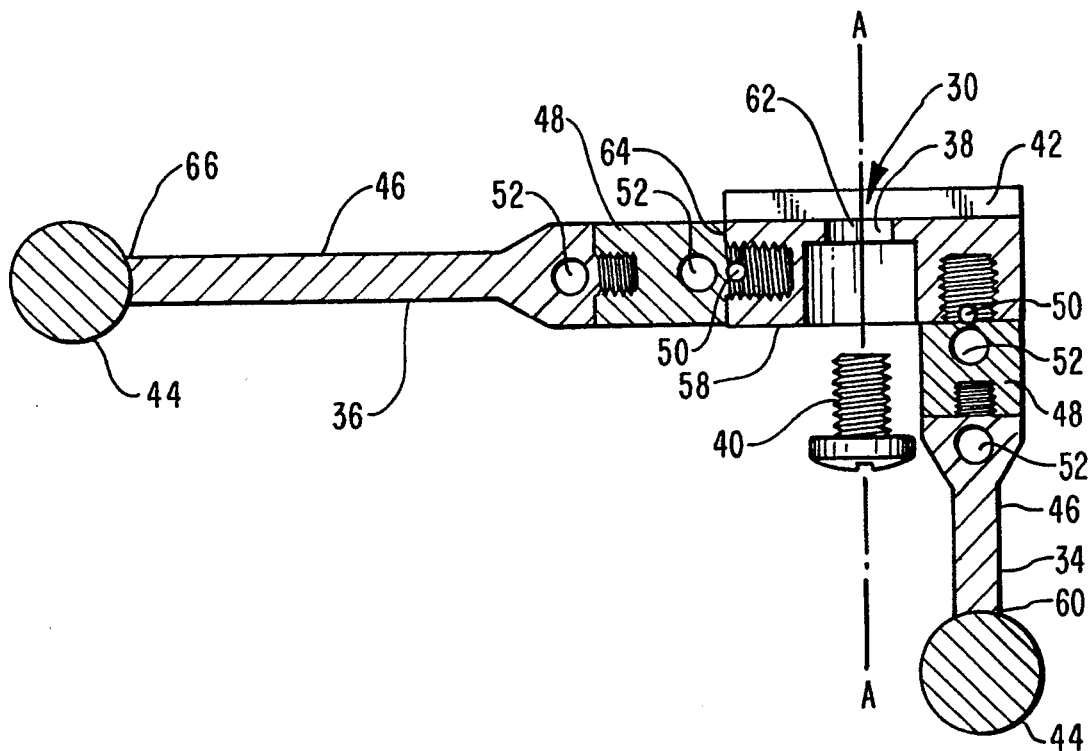
FIG. 4 is a cross-sectional view taken along line 4—4 of FIG. 3.

Reference is now made to the figures wherein like parts are referred to by like numerals throughout. With particular reference to FIGS. 3 and 4, a dual stylus probe attachment according to the present invention is generally designated at 30. The probe attachment 30 includes a base 32, a first stylus 34 and a second stylus 36.

The probe attachment 30 is configured for mounting to a probing mechanism which is mounted in a turret tool station of a numerically controlled (NC) lathe. The Okuma LC40 4-axis Simulturn lathe made by Okuma Machinery, Inc. of Hauppauge, N.Y. is an example of an NC lathe suitable for use with the present invention. Lathes of this type are widely used in the art, as are probes such as those illustrated in FIGS. 1 and 2. The probing mechanism of the present invention may include any of those probing mechanisms known in the art as being suitable for mounting on a turret tool station of an NC lathe, such as those made by Renishaw Electrical Ltd. of Gloucestershire, England.

Thus, the base 32 includes means for mounting the base 32 to a mounting plate of a probing mechanism whereby relative movement between the base 32 and the mounting plate of the probing mechanism is prevented. In one embodiment of the invention, the means for mounting the base 32 to the probing mechanism includes a hole 38 extending through the base 32 and a mounting screw 40 for attaching the base 32 to the sensing device of the probing mechanism along a longitudinal axis A of the probing mechanism.

In the embodiment of the invention illustrated in FIG. 3, the base is further configured with shoulders 42 which correspond to a male mounting plate on the sensing device of the probing mechanism. In mounting the base 32 to the probing mechanism, the shoulders 42 align in mating connection with the male mounting plate on the probing mechanism, thereby ensuring that the base is properly oriented with respect to the probing mechanism.

As will be appreciated by one of skill in the art, the particular configuration of the means for mounting the base 32 to the probing mechanism will vary according to the configuration of the mounting plate of the probing mechanism, which configuration may vary from manufacturer to manufacturer. The means for mounting the base to the probing mechanism generally corresponds to the means provided by the manufacturer on the conventional probes designed for attachment to the probing mechanism.

Styli 34 and 36 include sensing tips 44, attached at the distal ends of the styli 34 and 36. In a preferred embodiment, sensing tips 44 are ruby balls. It will be appreciated that other types of sensing tips may be successfully employed, such as any of the tips utilized on conventional probes.

In one embodiment of the invention, styli 34 and 36 further include shafts 46. Attached to the proximal ends of the shafts 46 are shear posts 48. As best illustrated in FIG. 4, shear posts 48 are adapted for attachment at their proximal end to the base 32 and at their distal end to a shaft 46. The shear posts 48 are preferably threadably connected to the base 32 and the shaft 46.

The styli 44 and 46 are preferably configured to break upon the application of a predetermined force to the styli. This prevents a force which could damage the probing mechanism from being transferred to the probing mechanism through either of the styli. In the illustrated embodiment of the invention, each shear post 48 is configured with a hole 50 at the base of the threads for inducing stress.

Consequently, when a force is applied to a stylus, generally at the sensing tip 44, the hole 50 in the stylus acts as a stress riser at that point inducing stresses at the hole 50 of significantly greater magnitude than those induced at other portions of the stylus. Thus, in the event a force of sufficient magnitude is applied to the stylus, the shear post 48 will break at the hole 50, thereby preventing the force from being transferred through the stylus to the probing mechanism.

In one preferred embodiment of the invention, shafts 46 are made of a ceramic material which will break upon the application of a sufficient force to the stylus, thereby preventing the necessity of utilizing shear posts. The ceramic material utilized in manufacturing the shafts 46 should thus be selected such that the application of a force having the potential to damage the probing mechanism would cause the shaft 46 to break. As with the use of a shear post, the breaking of the ceramic shaft prevents the potentially damaging force from being transferred through the shaft to the probing mechanism.

Styli 34 and 36 are preferably threadably connected to the base 32, thereby enabling the styli 34 and 36 to be easily replaced in the event they are damaged. Holes 52 are provided in the styli 34 and 36 and in the shear posts 48 for insertion of a tool for tightening and removing the styli and shear posts. In a presently preferred embodiment of the invention, first stylus 34 is attached at the face 58 of the base 32 and extends outwardly therefrom in a direction substantially parallel to the longitudinal axis A of the probing mechanism.

It is preferred that first stylus 34 be configured such that the distal end 60 of the stylus 34 extends in a direction substantially parallel to the longitudinal axis A of the probing mechanism such that the tip 44 of first stylus 34 is not positioned along the longitudinal axis A. In some probing mechanisms, it has been found that if force is applied to the probing mechanism along the longitudinal axis of the probing mechanism, the stylus and/or the probing mechanism may be damaged.

Thus, it has been found that most commercially available probing mechanisms will function optimally if the force transferred to the sensing device within the probing mechanism is transferred by creating a moment about the attachment point 62 of the base 32 to the probing mechanism. Such a moment tends to cause movement of the base 32 which is transferred to the sensing device of the probing mechanism thereby tending to actuate the probing mechanism.

First stylus 34 is therefore mounted to the base 32 such that a force applied to the tip 44 of stylus 34 in virtually any direction will create a moment about the attachment point 62. In particular, forces applied in a horizontal or vertical direction to the tip 44 of first stylus 34 will create such a moment. It is presently preferred that first stylus 34 be mounted to base 32 at a point offset of the attachment point 62 and such that the distal end 60 of the first stylus 34 extends in a direction parallel to the longitudinal axis A of the probing mechanism.

Second stylus 36 is attached at a side 64 of the base 32 and extends outwardly therefrom in a direction substantially perpendicular to the longitudinal axis A of the probing mechanism. It is presently preferred that second stylus 36 be configured such that the distal end 66 of the second stylus 36 extends in a direction substantially perpendicular to the longitudinal axis A of the probing mechanism and to the first stylus 34 such that the tip 44 of the second stylus 36 is not positioned along the longitudinal axis A.

Thus, a force applied to the tip 44 of second stylus 36 in virtually any direction will result in a moment about attachment point 62. It is anticipated that the majority of forces imparted to the tip 44 of the second stylus 36 will be applied in a horizontal or vertical direction. With the dual probe attachment configured as illustrated and described herein, such forces applied to the second stylus 36 will create a moment about attachment point 62 which will tend to actuate the probing mechanism.

Figure 1:
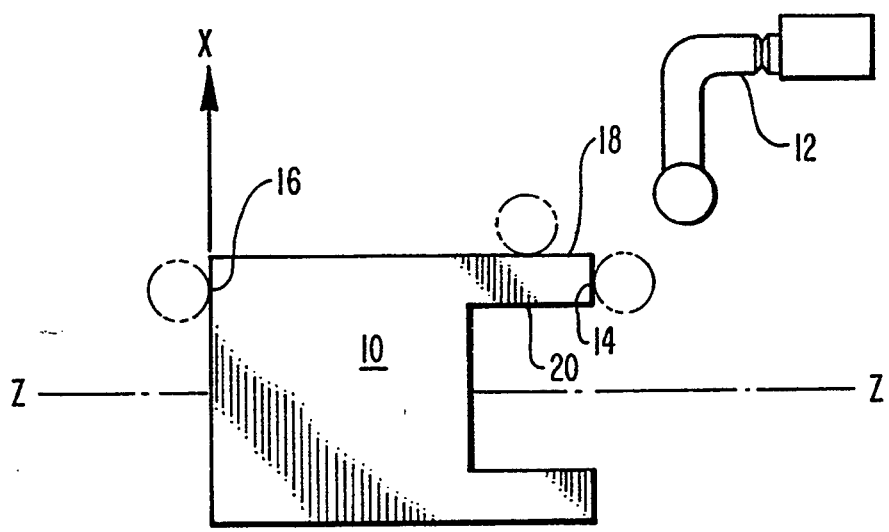
FIG. 1 is a plan view of a prior-art probe, illustrating the various surfaces on a workpiece it can probe.
Figure 2:
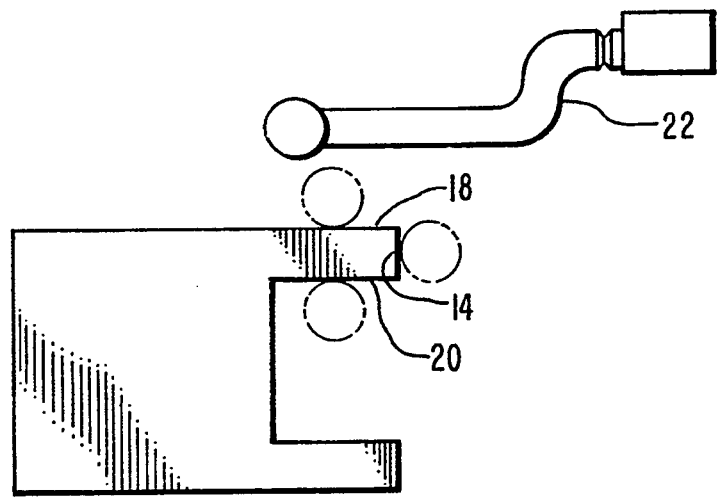
FIG. 2 is a plan view of a prior-art probe having a different configuration from that illustrated in FIG. 1, illustrating the various surfaces on a workpiece it can probe.

It will be appreciated by one of skill in the art that it may be possible to configure styli 34 and 36 in a variety of configurations, including, but not limited to, the configurations of the styli utilized in the prior-art probing devices illustrated in FIGS. 1 and 2. For some applications, it may be desirable to include styli that are disposed perpendicularly to each other and/or are not aligned with the longitudinal axis of the probing mechanism. However, it is presently preferred that styli 34 and 36 extend outwardly in a straight line thereby facilitating their alignment with the coordinate system of the probing mechanism. Thus, the configuration of styli illustrated herein may be easily threadably attached to the base and their alignment with the probing mechanism will be accurate regardless of how tightly they are screwed into the base.

In utilizing the multiple stylus probe attachment of the present invention, the attachment 30 is initially attached to the probing mechanism as previously described herein. The styli must then be calibrated according to any of those calibration methods commonly known in the art. Once calibrated, the probe may be utilized to measure various surfaces of a workpiece. Importantly, the probe attachment 30 of the present invention may be utilized to measure a front and back face 14 and 16, and an outside and inside diameter 18 and 20 of the workpiece 10 illustrated in FIGS. 1 and 2.

Whereas the machining of a workpiece such as the one illustrated at 10 in FIGS. 1 and 2 would require switching probes in order to measure the workpiece on the lathe with a conventional probe, utilizing the dual stylus probe attachment of present invention enables the workpiece to be measured without changing probes. Thus, the present invention results in a significant time savings.

From the foregoing, it will be appreciated that the present invention provides probing apparatus and methods which permit the measurement of various surfaces of a workpiece, thereby avoiding having to repeatedly change the stylus and recalibrate the probe. By utilizing the present invention, different shaped styli are employed in connection with a single probe, thereby avoiding having to repeatedly recalibrate the probe each time a stylus having a different configuration is necessitated.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A multiple stylus probe attachment capable of attachment to a mounting plate of a probing mechanism mounted to a turret tool station of a numerically controlled lathe for use in probing various surfaces of a workpiece, comprising:
    a base configured for attachment to the mounting plate of the probing mechanism along a longitudinal axis of the probing mechanism such that relative movement between the base and the mounting plate of the probing mechanism is prevented, said base including means for fixedly orienting said base with respect to the probing mechanism in the x and z directions;
    a first stylus attached to said base at a location offset from the longitudinal axis of the probing mechanism, said first stylus including a distal end extending in a direction generally parallel to the longitudinal axis of the probing mechanism, said distal end of said first stylus including a first sensing tip; and
    a second stylus attached to said base, said second stylus including a distal end extending in a direction generally perpendicular to the longitudinal axis of the probing mechanism, said distal end of said second stylus including a second sensing tip.

2. A multiple stylus probe attachment as defined in claim 1, wherein said first stylus and said second stylus include shafts to which said first and said second sensing tips are attached, said shafts being configured to break upon the application of a predetermined force to said sensing tip corresponding to said shaft, thereby preventing damage to the probing mechanism.

3. A multiple stylus probe attachment as defined in claim 2, wherein said shafts are made of a ceramic material.

4. A multiple stylus probe attachment as defined in claim 2, wherein said shafts are made of metal.

5. A multiple stylus probe attachment as defined in claim 4, wherein said first and said second styli are each configured with a hole extending laterally through said styli for inducing stress at said holes upon the application of said force to said sensing tips.

6. A multiple stylus probe attachment as defined in claim 5, wherein said first and second styli are each further configured with a shear post adapted for attachment at a proximal end to each of said bases and adapted for attachment at a distal end to each of said shafts, each of said shear posts being configured with one of said holes for inducing stress.

7. A multiple stylus probe attachment as defined in claim 1, wherein said base is further configured with a hole extending through said base and said probe attachment further comprises a mounting screw for attaching said base to the probing mechanism along the longitudinal axis of the probing mechanism.

8. A dual probe attachment capable of attachment to a mounting plate of a probing mechanism mounted to a turret tool station of a numerically controlled lathe for probing a front and back face and an inside and outside diameter of a workpiece in a workpiece holder, comprising:
    a base configured for attachment to the mounting plate of the probing mechanism along a longitudinal axis of the probing mechanism such that relative movement between the base and the mounting plate of the probing mechanism is prevented, said base including means for fixedly orienting said base with respect to the probing mechanism in the x and z directions;
    a first probing arm attached to said base at a location offset from the longitudinal axis of the probing mechanism for extension in a direction substantially axially of the workpiece holder, said first probing arm capable of probing an outside diameter, an inside diameter and a front face of the workpiece; and
    a second probing arm attached to said base for extension in a direction generally perpendicular to said first probing arm, said second probing arm capable of probing a back face, a front face and an outside diameter of the workpiece.

9. A probe attachment for attachment to a mounting plate of a probing mechanism mounted to a turret tool station of a numerically controlled lathe, comprising:
    a base configured for attachment to the mounting plate of the probing mechanism at an attachment point located along a longitudinal axis of the probing mechanism such that relative movement between the base and the mounting plate of the probing mechanism is prevented, said base including means for fixedly orienting said base with respect to the probing mechanism in the x and z directions;
    a first probing arm attached to said base at a location offset from the longitudinal axis of the probing mechanism and having a distal end extending outwardly from said base in a first direction; and
    a second probing arm attached to said base and having a distal end extending outwardly from said base in a second direction, said second direction being different than said first direction;

said first and second probing arms attached to said base such that a force applied to said distal end of either of said first and said second probing arms creates a moment about said attachment point tending to cause movement of said base thereby tending to actuate the probing mechanism.

10. A probe attachment as defined in claim 9, wherein said base is further configured with a hole extending through said base and said probe further comprises a mounting screw for attaching said base to the probing mechanism along the longitudinal axis of the probing mechanism and through said attachment point.

11. A probe attachment as defined in claim 9, wherein said first direction is parallel to the longitudinal axis of the probing mechanism.

12. A probe attachment as defined in claim 11, wherein said second probing arm is attached to said base such that said second direction is perpendicular to said first direction.

13. A probe attachment as defined in claim 12, wherein said base includes a side and said second probing arm is attached to said base at said side such that a line along said second direction intersects said attachment point.

14. A probe attachment as defined in claim 13, wherein said first and second probing arms are attached to said base by threaded engagement.

15. A multiple stylus probe attachment as defined in claim 1, wherein said means for orienting said base comprises shoulders configured in said base, said shoulders configured to permit said base to be aligned in mating connection with a male mounting plate on the probing mechanism.

16. A probe attachment as defined in claim 9, wherein said means for orienting said base comprises shoulders configured in said base, said shoulders configured to permit said base to be aligned in mating connection with a male mounting plate on the probing mechanism.

17. A probe attachment for use in combination with a probing mechanism mounted to a turret tool station of a numerically controlled lathe for probing various surfaces of a workpiece, comprising:

a base configured for attachment to the probing mechanism, said base including means for orienting said base with respect to the probing mechanism in the x and z directions;

a first arm extending outwardly from said base; and a second arm extending outwardly from said base in a direction generally perpendicular to said first arm such that said second arm may be used to probe surfaces of the workpiece which cannot be probed by said first arm.

18. A multiple stylus probe attachment capable of attachment to a mounting plate of a probing mechanism mounted to a turret tool station of a numerically controlled lathe for use in probing various surfaces of a workpiece, comprising:

a base configured for attachment to the mounting plate of the probing mechanism, said base including means for orienting said base with respect to the probing mechanism in the x and z directions;

a first stylus attached to said base, said first stylus including a distal end extending in a direction generally parallel to the longitudinal axis of the probing mechanism, said distal end of said first stylus including a first sensing tip; and a second stylus attached to said base, said second stylus including a distal end extending in a direction generally perpendicular to the longitudinal axis of the probing mechanism, said distal end of said second stylus including a second sensing tip.

* * * * *